Figure 1:

No. 684,230. Patented Oct. 8, 1901.
M. W. HANKS.
GLOWER TERMINAL FOR ELECTRIC INCANDESCENT LAMPS.
(Application filed Sept. 27, 1899.)
(No Model.)

Witnesses:
Raphaël Netter
J. H. Jones

Inventor
Marshall W. Hanks
by Charles A. Terry. Atty.

UNITED STATES PATENT OFFICE.

MARSHALL W. HANKS, OF PITTSBURG, PENNSYLVANIA, ASSIGNOR TO GEORGE WESTINGHOUSE, OF SAME PLACE.

GLOWER-TERMINAL FOR ELECTRIC INCANDESCENT LAMPS.

SPECIFICATION forming part of Letters Patent No. 684,230, dated October 8, 1901.

Original application filed April 22, 1899, Serial No. 714,057. Divided and this application filed September 27, 1899. Serial No. 731,792. (No model.)

*To all whom it may concern:*

Be it known that I, MARSHALL W. HANKS, a citizen of the United States, and a resident of Pittsburg, in the county of Allegheny and State of Pennsylvania, have invented certain new and useful Improvements in Glower-Terminals for Electric Incandescent Lamps, of which the following is a specification.

In electric lamps of the type wherein the illuminants or glowers are composed of the rare earths or mixtures thereof—such, for instance, as zirconium, yttrium, cerium, and the like—considerable difficulty has been experienced in making the connections between the ends of the glowers and the leading-in wires sufficiently intimate and strong to constitute a durable and efficient union. It has been proposed to wind a fine platinum wire about each end of the glower and to cover this small coil of platinum wire with a paste formed of materials similar to those of the glower itself. It has been found that such terminals are not always reliable and that they sometimes break away from the glower.

The object of the present invention is to obviate the insufficiencies of the terminal connection described and to provide a more lasting and efficient union between the leading-in wires and the end of the glowers by means which will be hereinafter described. The first step in the process of accomplishing this result usually consists in applying to the ends of the glowers beads or enlargements formed of chalk-like porous materials, these beads or enlargements being applied either by forming them independently of the glowers and afterward molding and pressing them into shape on the ends of the glowers or by adding them in the form of a paste to the glower ends either by dipping or by the use of a brush or other convenient means. When the beads or enlargements of chalk-like material have been thus applied to the glower ends, they are subjected to the action of an oxyhydrogen flame or its equivalent a sufficient length of time to thoroughly bake the material. The beads or enlargements are thus rendered sufficiently hard to preclude any material danger of destruction during subsequent manipulation. I then usually apply the leading-in wires by fusing them upon these enlargements by means of some conducting alloy—such as copper platinum, nickel platinum, manganoxid platinum, or the like. I have found that by treating a porous chalk-like bead of this sort after it has been applied to the ends of a glower with heat sufficient to bake it there will be no further shrinking of the bead, and any union which I make between such a bead and a leading-in wire is well suited to remain unbroken and to maintain itself under all the conditions of actual operation.

In the drawings which accompany this specification, Figures 1, 2, 3, and 4 illustrate different stages in the manufacture of the glowers and in the process of applying the terminals and attaching the leading-in wires.

Referring to the drawings, A, Fig. 1, represents a glower composed of a rare earth or a mixture of rare earths and having on its end beads or enlargements $a\ a$. The process by which the enlargements $a\ a$ are formed or placed upon the ends of the glower is preferably one of the following—that is to say, either a bead of chalk-like porous material is formed independently of the glower and molded and pressed upon its ends or the ends of the glower are dipped in a paste of such chalk-like porous material enough times to make the beads or enlargements of the size desired, or such a paste has been added with a brush until the proper thickness of chalk-like material has been added to the ends of the glower.

Figure 2:
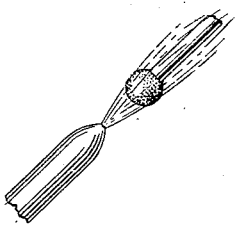

The glower, as it appears in Fig. 1 with the beads attached, is then treated, as is shown in Fig. 2, by being baked in an oxyhydrogen flame or other suitable source of heat, which process serves not only to bake the beads, as described, but also to bring about by means of the heat applied a perfect union between the beads and the ends of the glower.

Figure 3:
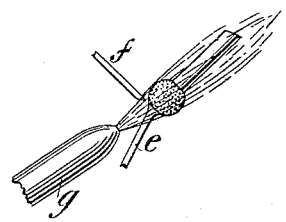

The glower after treatment by heat, as illustrated in Fig. 2, is brought into contact at its ends with the end of a leading-in wire $e$, Fig. 3, a conducting alloy $f$, of copper platinum, manganoxid of platinum, or the like, being applied simultaneously therewith or as a previous step in the process. Being subjected to heat in the presence of such a conducting alloy the end of the glower and the end of the leading-in wire become firmly united, and in practice I find that the union thus made is electrically adequate and mechanically strong and little liable to rupture.

Figure 4:
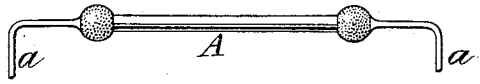

In Fig. 4 I show a glower in its complete state and having the leading-in wires attached as described in the foregoing specification.

It will be observed that the material constituting the solder or means of connection between the leading-wires and the ends of the glower extends over a sufficient surface to afford a good mechanical connection between the leading-wires and the glower-terminals. This device also serves to improve the electrical union of the two elements brought together in this way.

While the chalk-like material will usually appear as beads or enlargements on the ends of the glowers, yet the object sought to be attained is ultimately the providing of a glower-terminal to which the leading-wires can be readily and durably attached. Terminals of such material appearing in any other form than that of beads or enlargements would be quite within the scope of the present invention.

Should the leading-wire be of a metal other than platinum, the alloy may well contain as one of its constituents some other metal as a substitute for the platinum.

As an example of what I mean by "chalk-like" material I mention a mixture of one or more oxids of the rare earths moistened with water and held together by a binder, such as tragacanth, starch, or dextrin. A good mixture for the purpose may be made of kaolin formed into a paste by means of water and dextrin. I may add to the mixture calcium oxid or magnesia, or both, or I may use calcium oxid, magnesia, or some rare earth in place of kaolin.

The method herein referred to forms the subject of another application for patent filed April 22, 1899, Serial No. 714,057, and of which the present application is a division.

The invention claimed is—

1. A terminal for an incandescent-lamp glower composed throughout of one or more rare earths, the said terminal consisting of a bead or enlargement of a porous material, which is a non-conductor when cold.

2. A terminal for an incandescent-lamp glower composed throughout of one or more rare earths, the said terminal consisting of a bead or enlargement on the end of the glower, the said bead or enlargement being of a baked porous material which is a non-conductor when cold.

3. A glower for incandescent electric lamps composed of one or more rare earths, consisting of a main body adapted to become luminous under proper conditions, the ends of said body being covered with beads or enlargements of suitably-baked material of different composition from the main body the conductivity of which increases with heat.

4. A glower for incandescent electric lamps consisting of a main body of one or more rare earths adapted to become luminous under proper conditions, the terminals consisting of beads or enlargements on the ends of said glower, the said beads or enlargements consisting of a baked porous material the conductivity of which increases with heat, and leading-in wires secured to the said beads or enlargements.

5. In an electric incandescent lamp, a glower composed of a material which is a non-conductor when cold and a conductor when hot, a bead or enlargement on the end of said glower, said bead or enlargement being of a baked porous material, a conducting-wire secured to the said bead or enlargement, and an alloy uniting the same.

6. The combination with a glower of the type described, of a terminal therefor consisting of a body of chalk-like material which is a non-conductor when cold.

Signed at Pittsburg, in the county of Allegheny and State of Pennsylvania, this 25th day of September, A. D. 1899.

MARSHALL W. HANKS.

Witnesses:
 CHARLES A. TERRY,
 JAMES B. YOUNG.